Patented Mar. 3, 1931

1,795,238

UNITED STATES PATENT OFFICE

DELLAS J. SPENCE, OF BRANSON, MISSOURI

FISH BAIT

No Drawing.    Application filed May 19, 1928.  Serial No. 279,203.

My invention relates to improvements in bait and primarily to fish bait,—although the same is capable of use for baiting traps to attract certain animals, such as opossum and skunk.

An important object of the invention is to provide a fish bait which will have the requisite decomposed odor to attract cat fish and other sucker mouthed fish, carp, buffalo, red horse, etc.—and in short the vast majority of the species of inland fish,—and which bait will have a body of such consistency as to enable it to be made up into individual baits and sold in cans or boxes.

A further object of the invention is to provide a bait, as characterized, which will readily hold its form and which will not readily decompose in use.

A further object of the invention is to provide a solid fish bait having decomposed or fermented odor and which includes novel means and compositions of elements for accentuating said decomposed odor and for giving the bait a further characteristic of sweetness, which is attractive to practically all kinds of fish and particularly to the species hereinabove mentioned.

In carrying out the invention I prefer to use the following ingredients in substantially the proportions set forth:

Solids

| | |
|---|---|
| Whole wheat flour | 1 bushel |
| Cornmeal | ½ peck |
| Cheese | 1 bushel |

Liquids

| | |
|---|---|
| Corn syrup | 1 quart |
| Sorghum syrup | 1 quart |
| Licorice, 1 large commercial stick dissolved in water | ½ pint |
| Coffee and chicory solution | 1 quart |
| Yeast cake dissolved in water | ½ pint |
| Cotton seed oil | 3 pints |

The proportions of the ingredients may be otherwise given as follows:

Solids

| | Per cent |
|---|---|
| Whole wheat flour | 50 |
| Corn flour | 10 |
| Cheese | 40 |
| Total | 100 |

Liquids

| | Per cent |
|---|---|
| Corn syrup | 20 |
| Sorghum syrup | 20 |
| Licorice (dissolved in water) | 5 |
| Coffee and chicory solution | 20 |
| Yeast (dissolved in water) | 5 |
| Cotton seed oil | 30 |
| Total | 100 |

In compounding the bait the wheat flour, corn flour and cheese are ground up and thoroughly mixed in a bowl. The liquids in the proportions mentioned are separately mixed and thoroughly stirred in another vessel. Then the entire quantity of the liquid is poured into the mass of wheat flour, corn flour and cheese to reduce the latter mixture to a paste having about the consistency of dough.

The paste, thus formed, is made into pellets of desired size and packed in an air-tight box ready for use.

The wheat flour contains or supplies the adhesive properties necessary to hold the pellet together so that it will stay on the hook. The corn flour gives the bait a flavor and bulk. The flavor given by the corn flour in combination with the other ingredients is that of fermentation and this characteristic makes the bait particularly attractive to sucker mouth fish, such as carp and buffalo.

The cheese is used as a body along with the corn flour and wheat flour and is employed particularly because of the decomposed nature of the odor given off therefrom. The corn flour particularly is imbued with fermentable characteristics.

Turning now to the liquid solution which is added to the solids just referred to, the corn syrup is used as a sweetening, as is also the sorghum syrup and both help to consume or ferment the cereals so as to cooperate in the production of a satisfactory bait for the purpose specified. The corn syrup particularly cooperates with the wheat flour in that it furnishes further adhesive properties, which are very helpful in holding the pellets together.

The licorice is used to give the pellets or bait a further attractive scent and this is also true as to the coffee and chicory. The yeast is added for the purpose of accentuating the fermentation of the body of the bait as a whole in that it speeds up the fermentation caused by the mixture of the sweets with the cornmeal. The function of the cotton seed oil in the liquid is for the purpose of making the pellets more resistant to water and for providing what might be said to be a film of oil around the outer surface of the pellet. Manifestly, the cotton seed oil will tend to prevent the pellet from being attacked by the water and thereby decomposed.

From the foregoing description it will be readily apparent that I have provided a bait which will prove very attractive to fish and which can be used without inconvenience on the part of the fisherman. More specifically, the fisherman is not under the necessity of rolling the pellets himself and contaminating his hands with the odor of the bait. In addition to the decomposed odor of the bait the odor of the coffee and licorice is discernible and it will therefore be apparent that the bait will attract fish that would not be attracted by a merely fermented or decomposed odor.

The cheese may be of any preferred kind. The oil or fluid content of the cheese varies of course with different kinds and ages. Sometimes as when the cheese is dry it is necessary to increase the quantity of cotton seed oil slightly. Conversely, when the cheese has a high fluid content a little extra wheat flour must be added to produce a paste of just the right consistency.

Having thus described my invention, what I claim as new and desire to secure by Letters Patent is:

1. A bait comprising the reaction products of fermentable flour and cheese and an oily liquid of a heavily sweetened nature containing yeast, for effecting a fermentation or decomposition of the ingredients susceptible thereto.

2. A bait comprising the reaction products of equal quantities of solid and liquid materials, the solid materials being in approximately the following proportions: wheat flour 50%, corn flour 10% and cheese 40%; and the liquid materials being in approximately the following proportions: corn syrup 20%, sorghum syrup 20%, licorice (dissolved in water) 5%, coffee and chicory solution 20%, yeast (dissolved in water) 5% and cotton seed oil 30%.

In testimony whereof I affix my signature.

DELLAS J. SPENCE.